US010025460B1

(12) United States Patent
Almand et al.

(10) Patent No.: US 10,025,460 B1
(45) Date of Patent: Jul. 17, 2018

(54) SYSTEMS AND METHODS FOR DISPLAYING MENU ITEMS

(71) Applicant: VersionOne, Inc., Alpharetta, GA (US)

(72) Inventors: Matthew Almand, Alpharetta, GA (US); Rajiv Delwadia, Berkeley Lake, GA (US); Bob Vincent, Alpharetta, GA (US); Ian Culling, Berkeley Lake, GA (US); Robert Holler, Cumming, GA (US)

(73) Assignee: VERSIONONE, INC., Alpharetta, GA (US)

( * ) Notice: Subject to any disclaimer, the term of this patent is extended or adjusted under 35 U.S.C. 154(b) by 0 days.

(21) Appl. No.: 14/220,096

(22) Filed: Mar. 19, 2014

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC ....................................................... G06F 3/048
See application file for complete search history.

(56) References Cited

U.S. PATENT DOCUMENTS

| 7,895,524 | B2* | 2/2011 | Zaner | G06Q 10/10 709/204 |
| 8,751,491 | B2* | 6/2014 | Fitzmaurice | G06F 17/276 707/727 |
| 8,768,965 | B2* | 7/2014 | Kimball | G06F 3/0481 707/784 |
| 2015/0089448 | A1* | 3/2015 | King | G06F 3/0482 715/811 |

* cited by examiner

*Primary Examiner* — Thanh Vu
(74) *Attorney, Agent, or Firm* — Morgan, Lewis & Bockius LLP

(57) ABSTRACT

System and methods for displaying menu items are disclosed. In some implementations, a method includes: analyzing user interaction with a menu over a first time period. The menu includes a plurality of menu items. The method further includes, causing, a first menu item in the plurality of menu items, to be displayed with a first visual characteristic in accordance with the user interaction. The first visual characteristic relates to at least one of: size, shape, and color. In some implementations, the user interaction is associated with a first user, and the first menu item is displayed with the first visual characteristic to a second user.

18 Claims, 9 Drawing Sheets

SYSTEMS AND METHODS FOR DISPLAYING MENU ITEMS

TECHNICAL FIELD

The disclosed implementations relate generally to displaying menu items.

BACKGROUND

Menu item customization has become increasingly important. For example, a user might want menu items arranged based on usage information, e.g., a frequently-used menu item is displayed at the top of a list, while a less frequently-used menu item is displayed at the bottom of a list or hidden from display altogether.

However, difficulties abound with these approaches for display menu items because sometimes a list structure is insufficient to handle complex menu item arrangements (e.g., grouping or ungrouping); and because other visual characteristics (besides placing a menu item in different positions in a list) may be more useful in terms of menu item customization.

The above identified technical problems are reduced or solved by the systems and methods disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The implementations disclosed herein are illustrated by way of example, and not by way of limitation, in the figures of the accompanying drawings. Like reference numerals refer to corresponding parts throughout the drawings.

SUMMARY

Figure 1:
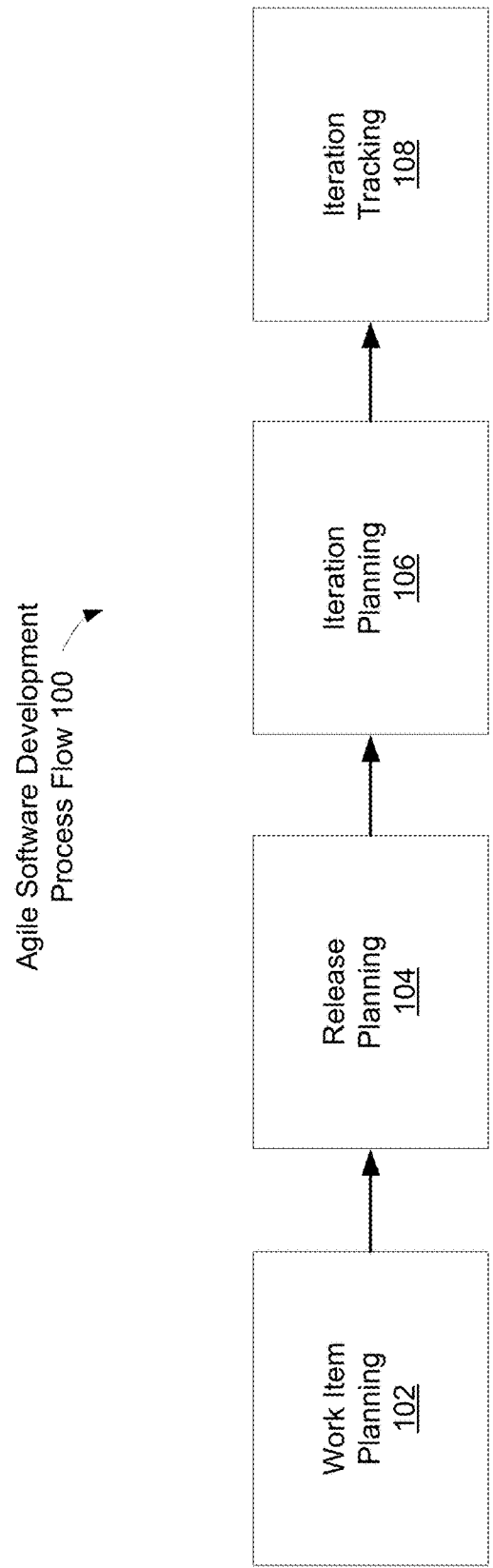
FIG. 1 is a block diagram illustrating an example agile software development process, in accordance with some implementations.

Systems and methods for displaying menu items are disclosed. In some implementations, a method includes: analyzing user interaction with a menu over a first time period, wherein the menu includes a plurality of menu items. The method further includes causing a first menu item in the plurality of menu items to be displayed with a first visual characteristic in accordance with the user interaction, wherein the first visual characteristic relates to at least one of size, shape, and color.

In some implementations, the user interaction is associated with a first user, and the first menu item is displayed with the first visual characteristic to a second user.

In some implementations, the first user and the second user are associated with the same team.

In some implementations, the first user, and the second user are associated with the same project.

In some implementations, the first user, and the second user are associated with the same access privilege.

In some implementations, the second user is specified by the first user.

In some implementations, the user interaction with the menu takes place at a second computing device distinct from the computing device.

In some implementations, the user interaction with the menu is obtained from a computing cloud/networked server distinct from the computing device.

In some implementations, the user interaction with the menu is selected from a plurality of user interactions by the second user.

In some implementations, the first menu item corresponds to a user task, and the method further includes automatically, without user intervention, causing to be displayed information representing progress of the user task.

In some implementations, the method further includes causing the first menu item to be displayed at a different location in accordance with the user interaction.

In some implementations, the method further includes causing the plurality of menu items to be displayed, with the first visual characteristic in accordance with the user interaction.

In some implementations, the plurality of menu items further includes a second menu item, and the method further includes grouping together the first menu item and the second menu item in accordance with the user interaction.

In some implementations, the first menu item and the second menu item are grouped together without regard to a work flow sequence between a first task corresponding to the first menu item and a second task corresponding to the second menu item.

In some implementations, the plurality of menu items further includes a second menu item, and the method further includes causing the first menu item and the second menu item in a sequence in accordance with the user interaction.

In some implementations, the sequence in which the first menu item and the second menu item is displayed is independent from a work flow sequence between a first task corresponding to the first menu item and a second task corresponding to the second menu item.

In some implementations, the user interaction is associated with a first user, and the first menu item is displayed with the first visual characteristic to the first user.

In some implementations, the user interaction is associated with a first user having a first privilege type and the method further includes identifying a user action with respect to the menu by a second user having a second privilege type, and causing, the first menu item in the plurality of menu items, to be displayed with a second visual characteristic in accordance with the second privilege, without regard to the user interaction.

In some implementations, computing devices and non-transitory computer readable storage mediums for performing one or more steps of the above-described methods are also provided.

DETAILED DESCRIPTION

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the implementations.

FIG. 1 is a flow diagram illustrating an agile software development process flow 100 in accordance with some implementations. Support for performing operations in the process flow 100 can be provided by agile development management software.

Work item planning (102) includes identifying work to be performed during the software development process. For example, features to be included in the software being developed are specified and software defects to be fixed during development are identified. Depending on the agile methodology being used, features also may be referred to as stories, backlog items, or requirements. In general, a work item is any item for which the agile development management software platform can track progress, such as time spent working on the item. Estimates for the time that work items require for completion (e.g., the time to complete features or to fix defects) may be entered during the work item planning process. Furthermore, groups of work items may be defined. For example, a feature group may be defined to include a plurality of features. Work estimates for the features within a feature group may be added together to provide an overall work estimate for the feature group. The work estimate for a group of work items (e.g., a feature group) thus may provide a roll-up of the work estimates for the individual work items (e.g., features) in the group.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some implementations, a task is defined such that it takes no more than 3 days to perform. A test is an acceptance criterion that a feature must satisfy. Estimates for the time required to complete tests and tasks that make up an interaction may be entered at this stage. In some implementations, the estimates for tasks and tests are independent of the estimates for their features. Tasks and tests are examples of work items.

One or more goals may be defined during work item planning 102, release planning 104, and/or iteration planning 106. A goal name may be entered and one or more work items assigned to the goal. The goal thus serves as a roll-up of a set of work items. In some implementations, the set of work items is user-defined. Work items assigned to a particular goal may be associated with a single level or multiple levels in a project hierarchy. For example, a particular goal may roll up work items associated with a particular project, sub-project, release, team and other internal organization, client or customer, or vendor. Alternatively, a particular goal may roll up work items associated with various projects, sub-projects, releases, teams and other internal organizations, clients or customers, and/or vendors. Examples of goals include an objective for a particular project, a project milestone, and a strategic goal for a company or business unit.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, parking lot reports, scope change, defect trending, test case status, and defect actuals. A burndown chart illustrates remaining work vs. time. Velocity refers to the estimated work per iteration on a project. Scope change refers to a change in requirements, such as the addition or deletion of features and defects. Reports may be generated for a specified level or node in the project hierarchy (e.g., for a specified project, sub-project, release, team or other internal organization, client or customer, and/or vendor.) Reports also may be generated for particular goals.

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

At a high level, the agile software development process has various assets associated with it. Nodes in the project hierarchy, such as projects, sub-projects, releases, teams, clients, and vendors, can be considered assets, as can iterations. Work items such as features and defects are assets, as are tasks and tests. Feature groups are assets, as are goals. Assets may be associated with (i.e., related to) other assets. In some implementations, for example, tasks and tests are associated with corresponding features and defects, which in turn may be associated with corresponding iterations. In another example, features in a particular feature group are associated with the feature group.

An asset includes various attributes. In some implementations, each kind of asset (e.g., project, goal, feature group, feature, task, etc.) has a specified set of associated, or related, attributes. Types of attributes include text strings, numerical values, values calculated according to a formula ("synthetic attributes"), and associated/related assets. A first asset associated with (i.e., related to) a second asset thus is considered an attribute of the second asset. An attribute may be automatically included (e.g., hard-coded or created for a particular installation) in agile development management software or may be customized (i.e., user-defined).

Attention is now directed to user interfaces for agile development management software. In some implementations, user interfaces are shown in a browser window. In some implementations, user interfaces are shown by a stand-alone application, such as an agile development management software application.

In some implementations, agile development management software can display groups of assets of a particular type. For example, groups of assets associated with work item planning, release planning, or iteration planning may be displayed.

FIGS. 2A-2E are screen images illustrating example user interfaces for displaying menu items, in accordance with some implementations.

Note that, in the present disclosure, references to a number of times, number of days, or similar quantities that are used to evaluate user interaction with elements of a visual application user interface are merely examples and are not intended to be limiting as to the number or the type of user interaction that is evaluated.

In fact, the disclosed techniques are applicable to characterization of a wide array of user interaction types with a user interface to provide for adaptive display of the user interface elements, and a wide range of threshold values/interaction totals for those different interaction types as appropriate to identify meaningful interaction differences and trends for the menu items over reasonable evaluation time periods.

Figure 2A:
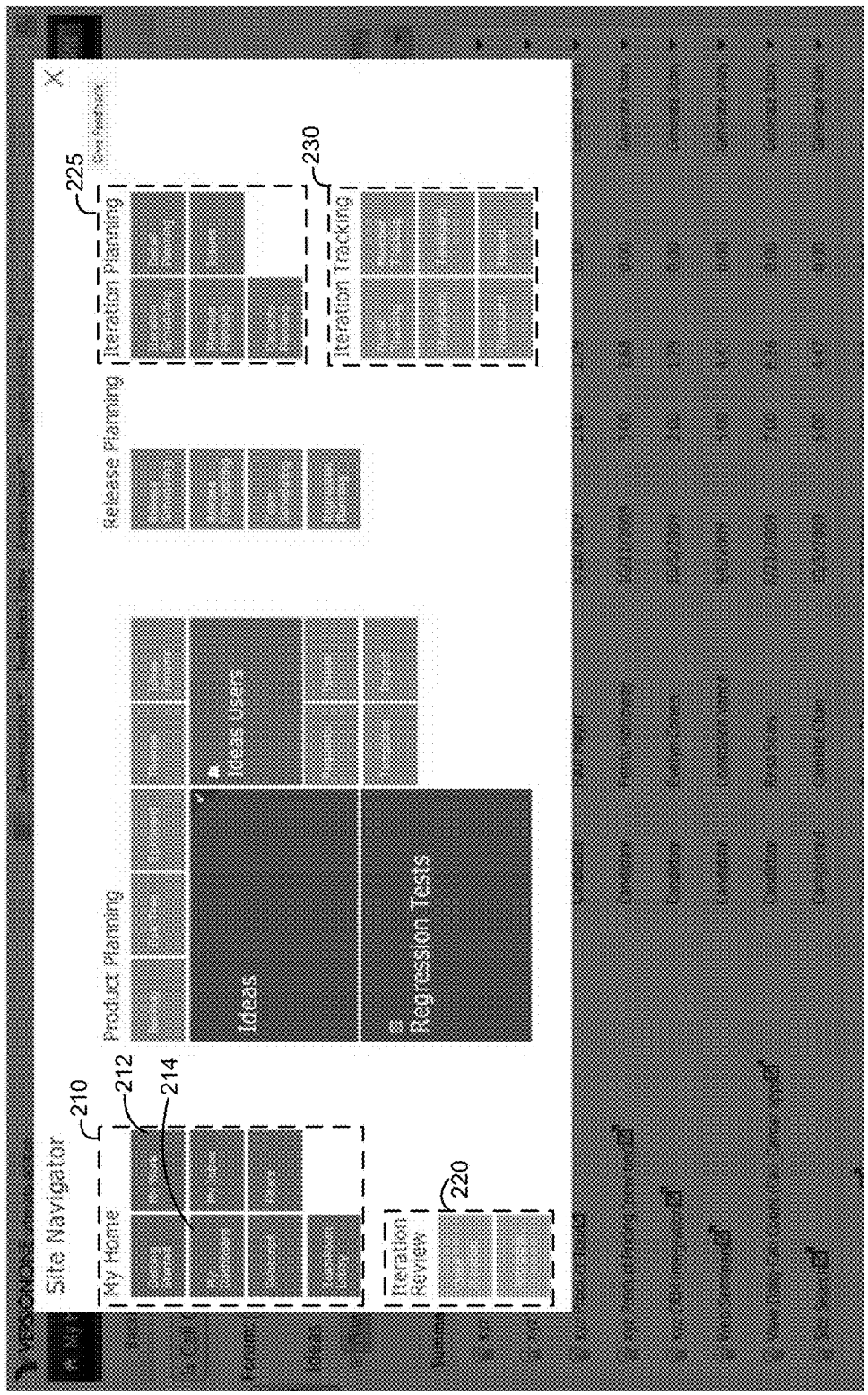
FIGS. 2A-2E are screen images illustrating example user interfaces for displaying menu items, in accordance with some implementations.

As shown in FIG. 2A, in some implementations, a user interface 200 includes a plurality of menus, such as the My Home 210, Iteration Review 220, Product Planning, Release Planning, Iteration Planning 225 and Iteration Tracking 230. In particular, FIG. 2A illustrates one implementation of predetermined visual characteristics for the user interface 200 and menus and menu items displayed thereon prior to any modification of these characteristics based on evaluation of user interactions with the corresponding software.

Each of the menus shown in FIG. 2A includes one or more menu items that are displayed as part of a visual group of graphical elements at a particular location on the user interface 200. For example, the "My Home" menu 210 includes multiple menu items (including "My Work" and My Dashboard" menu items 212, 214) and is displayed as a group at the upper left corner of the user interface 200. In some implementations, each menu item is displayed with a respective shape and color and is associated with a descriptive label. For example, each of the menu items shown as part of the My Home menu 210 has a similar dark gray color and a similar rectangular shape. As described below, in some implementations, the colors and shapes of respective menu items are adjusted so to highlight certain menu items. For example, while most of the items in the Product Planning menu are in the pink/mauve/burgundy color family, the Import menu item of the same menu is shown in a contrasting color (i.e., bright green in the illustrated implementation) to highlight that important menu item.

As described in greater detail below, in some implementations the size of particular menu items is varied based on user interactions (individual and/or group) with the items. For example, in some implementations, menu item size is varied to show popularity of the item (with a particular user or group of users), how recently that menu item was used (by a particular user or group of users), and/or importance of the menu item (e.g., more important items can shown using a larger shape). In a similar manner the color and position of particular menu items can be adjusted based on user interactions (individual and/or group) with the items.

In some implementations, the plurality of menu items 210 is initially displayed with default or predefined visual characteristics when less than a predefined amount of data reflecting user interaction with the plurality of menu items 210 has been collected. For example, when a user has only recently installed a software application that provides the user interface 200, and thus has not interacted with the user interface 200 for more than a time period (e.g., more than a week), the plurality of menu items is displayed using default menu settings. For example, as shown in FIG. 2A, the group 210 of "My Home" menu items is displayed at the default upper left corner of the user interface with a default dark gray color and a default uniform menu item size.

In some implementations, one or more logical or work flow relationships exist between the menu items in the plurality of menu items of a menu. For example, the menu item 212 "My Work" when selected displays one or more pending (e.g., unfinished or in progress) user tasks, while the menu item 214 "My Dashboard" when selected displays all work items associated with a user, such as completed user tasks, pending user tasks, tasks assigned to another user under supervision by the user, project scheduling information, resource allocation information associated with the user etc. Due to their related uses, these menu items are both grouped with other items in the My Home menu 210.

In some implementations, menu items associated with a less frequently-used process/menu are displayed at an out of the way location or in a less than optimal position of the user interface 200 compared to more frequently-used processes/menus. For example the plurality of menu items associated with the Iteration Review menu 220 are initially displayed at a relatively less-conspicuous location of the user interface 200 (e.g., at the lower left corner) because the corresponding "Iteration Review" process is a relatively less frequently-used process of the agile software development application whose menus/processes are depicted in the user interface 200. The default display positions of different menus and their associated menu items can be determined initially based on the typical relative usage of those menus and their respective menu items. For example, more frequently-used items are placed in prime positions, such as at or near the upper left position of the user interface 200. In some implementations, these display positions be adjusted based on user interactions with the software.

In some implementations, the prime positions in the user interface 200 are determined based on display characteristics of a graphical window in which the user interface 200 is displayed. For example, in some implementations, on a landscape-oriented graphical window, the prime display positions are those to the upper left of the display as those positions are almost always viewable by a user without scrolling. By this same viewability criterion, the prime display positions in a landscape-oriented display are similar, but due to display height also include more positions near the center of the display.

In some implementations, the positions of respective menu groups are determined based on relationships between corresponding processes in a software development methodology associated with the user interface. For example the plurality of menu items 230 associated with the Iteration Tracking menu 230 is initially displayed at the lower right corner of the user interface 200, below the plurality of menu items 225 associated with the Iteration Planning menu 225, because, in an agile software development process, "Iteration Tracking" comes after "Iteration Planning."

Figure 2B:
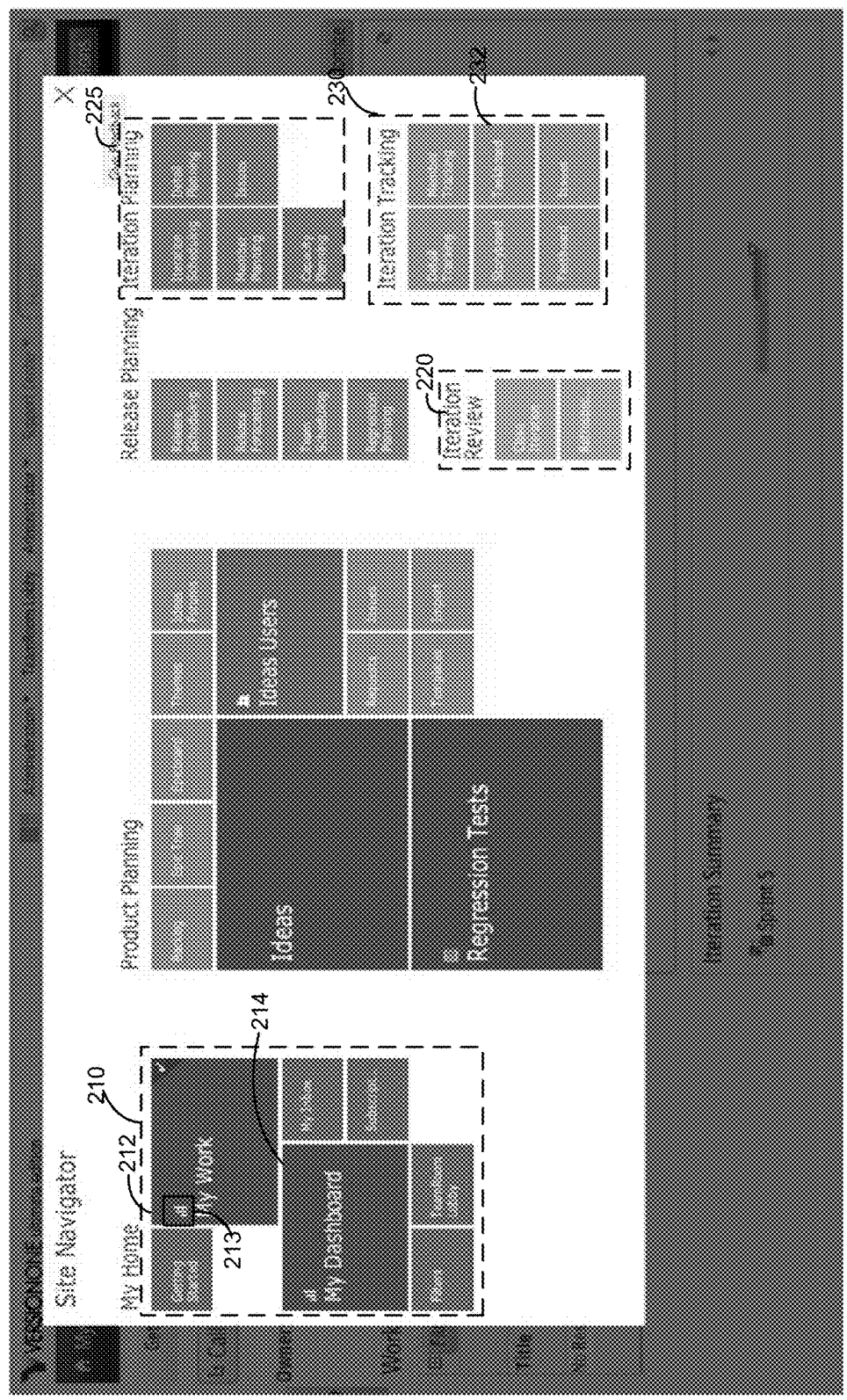
Figure 4:
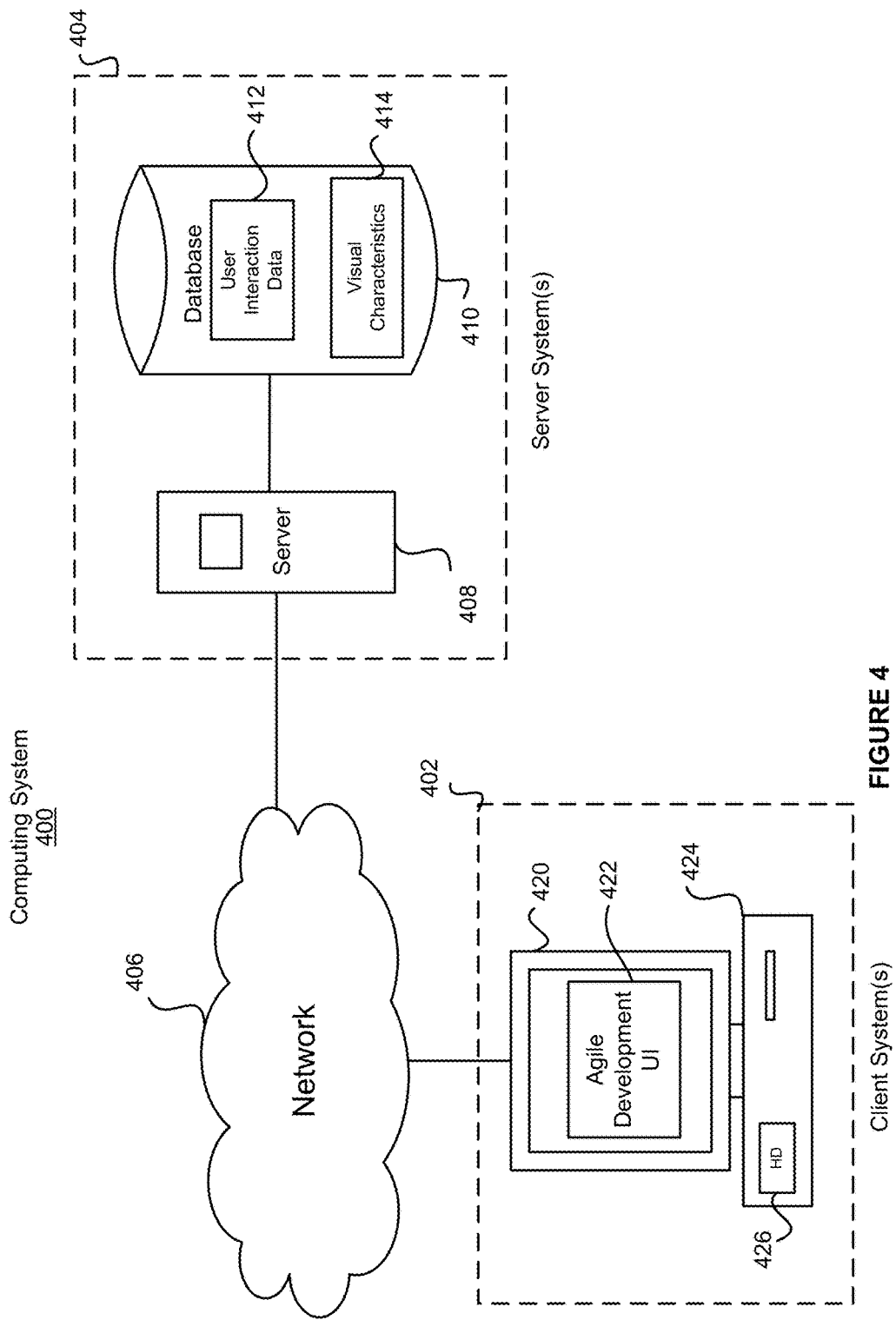
FIG. 4 is a block diagram illustrating a computing system for displaying menu items, in accordance with some implementations.

FIG. 2B illustrates the user interface of FIG. 2A following a first period of user interactions with the menus and menu items shown therein. As shown in FIG. 2B, in some implementations, after a first set of user interactions with the user interface 200 is detected and analyzed, the pluralities of menu items 210, 220, and 230 are displayed with one or more different visual characteristics from those shown in FIG. 2A. These different characteristics reflect the detected and analyzed user interactions. In some implementations, the interactions that are detected and analyzed include any single user interaction, or sequence of two or more user interactions with the menus and menu items of the user interface 200. These interactions include, for example: (a) selection of individual menu items, (b) sequences of selection of menu items, (c) first N menu items selected after the program is loaded or the user interface displayed, and (d) time duration spent with features corresponding to the selected menus and/or menu items. Information for these and other interactions that are tracked are saved in the user interaction data 412 (FIG. 4).

In some implementations, the first set of user interactions with the user interface 200 includes user activities with respect to the user interface 200 over one or more time periods, such as one or more days, one or more weeks, one or more months, or one or more calendar quarters. In some implementations, the first set of user interactions with the user interface 200 includes user activities with respect to a component in the user interface 200.

For example, in some implementations, the user activities that are detected and analyzed over time include the number of user selections of respective menu items (e.g., menu items 212 and 214) from the plurality of menu items 210. In some implementations, the first set of user interactions with respect to a component (e.g. the menu item 214) in the user interface 200 affects the visual appearance of another component (e.g., the plurality of menu item 230) in the user interface 200. For example, in some implementations, when a user has intensively used menu items in the "Iteration Planning" 225 group, the visual appearances of menu items in the "Iteration Tracking" 230 are also changed, because it may logically be concluded that once a user has finished planning an iteration (e.g., using the "Iteration Planning" 225 menu items), tracking the iteration (e.g., using the "Iteration Tracing" 230 menu items) may be the next course of action, and as such, menu items relating to "Iteration Tracking" 230 are displayed more prominently or conspicuously in comparison to the "Iteration Planning" 225 menu items.

As one example, as shown in FIG. 2B, in some implementations, after a first set of user interaction with the user interface 200 is detected and analyzed, the menu items 214 are displayed in a larger size (or with a darker color) than shown in FIG. 2A, e.g., because a user has intensively interacted with the menu item "My Work" 213 and it is therefore logical to conclude that the user is now likely to use the menu item "My Dashboard" 214.

For another example, as shown in FIG. 2B, in some implementations, after a first set of user interactions with the user interface 200 are detected and analyzed (e.g., after a user has clicked menu items 212 and 214 more than N times in the past hour—where N is an integer, such as 10, for example), the plurality of menu items 210 (the menu items 212 and 214, in particular) expands in size and/or shape, thereby rendering the plurality of menu items 210 more conspicuous (visually) or accessible (physically, e.g., easier to click)—e.g., due to the increased size.

In contrast to the visual changes to the plurality of menu items 210, the plurality of menu items 220, however, becomes less conspicuous. For example, in comparison to what is shown in FIG. 2A, in FIG. 2B, the plurality of menu items 220 is relocated from a first location (e.g., the lower left corner) to a second location (e.g., approximately the lower right corner) in the user interface 200.

For a third example, as shown in FIG. 2B, in some implementations, after a first set of user interaction with the user interface 200 is detected and analyzed, a progress tracker 213 is displayed as part of the menu item 212. Note that, in FIG. 2A, the progress tracking 213 is not displayed as part of the menu item 212, e.g., because user interaction has not reached a predefined amount at the state shown in FIG. 2A.

Figure 2C:
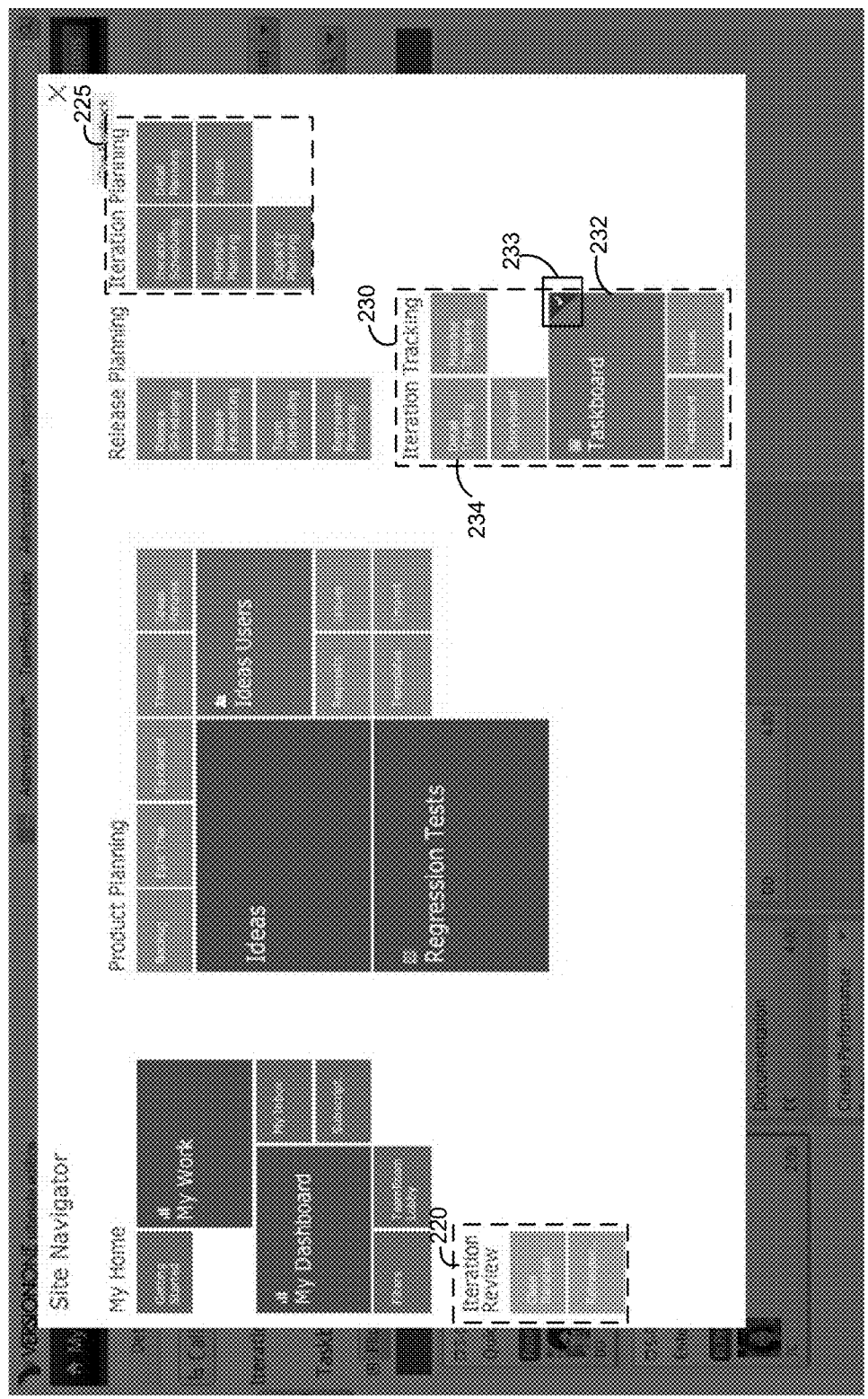

FIG. 2C illustrates the user interface of FIGS. 2A and 2B following a second period of user interactions with the menus and menu items shown therein. As shown in FIG. 2C, in some implementations, after a second set of predefined user interaction with the user interface 200 is detected and analyzed, the plurality of menu items 230 is displayed with one or more different visual characteristics than shown in FIG. 2B.

In some implementations, different user interactions are detected and analyzed to determine how to display menu items, over predefined time periods. For example, in some implementations, the second set of predefined user interaction differs (e.g., is distinct) from the first set of predefined user interaction explained above with respect to FIG. 2B. In some implementations, the second set of predefined user interaction is single clicks, while the first set of predefined user interaction is double clicks. In some implementations, the second set of predefined user interaction is mouse hovers, while the first set of predefined user interaction is mouse clicks. In some implementations, the second set of predefined user interaction is mouse clicks (e.g., clicking a "Stop" button), while the first set of predefined user interaction is keyboard shortcuts (e.g., pressing the CTRL key and the C key at the same time), which in some cases suggests that a user has gained proficiency with respect to the user interface 200.

For example, as shown in FIG. 2C, in some implementations, after a second set of predefined user interaction with the user interface 200 is detected and analyzed, the plurality of menu items 220 is moved from the second location (e.g., approximately the lower right corner as shown in FIG. 2B) back to the first location (e.g., approximately the lower left corner as shown in FIG. 2A), e.g., due to a lack of user interaction with the user interface 200 over a predefined time period (e.g., no more than 10 clicks within the past 3 days), or due to an increased amount of user interaction with the user interface 200 (e.g., a sequence of intensive mouse clicks, trying to manually revert/override a recent visual change). These methods are technically advantageous, because they allow a user interface to reset itself to a default or prior state (e.g., revert a recent visual characteristic change, such as reducing the size of menu items 212 and 214 from what is shown in FIG. 2B back to those shown in FIG. 2A), upon detecting that user interaction is reduced after the recent visual characteristic change takes place—which may indicate that a user's confusion or lack of comfort with the recent change to the user interface.

For another example, as shown in FIG. 2C, in some implementations, after a second set of predefined user interaction with the user interface 200 is detected and analyzed, the plurality of menu items 230 changes its visual appearance. For example, the menu item 232 is displayed in a large size and/or a darker color, due to frequent usage in the past 2 days.

For a third example, as shown in FIG. 2C, in some implementations, the plurality of menu items 220 is relocated to a less conspicuous location, when a user has been intensively using the plurality of menu items 230 in the past week, which suggests that the user is likely to continue using the plurality of menu items 230 (hence the more conspicuous visual appearance, e.g., a more prominent location/ color/contrast/font size), and thus less likely to use the plurality of menu items 220 (hence the less conspicuous visual appearance, e.g., a less prominent location/color/contrast/font size).

For a fourth example, as shown in FIG. 2C, in some implementations, the plurality of menu items 230 is displayed more prominently, when a user has been intensively using the plurality of menu items 220 in the past week, which suggests that the user is likely to finish "Iteration Tracking" and thus begin "Iteration Review" soon. (Note that, in some agile development processes, an iteration is first planned, then tracked, and subsequently has its progress reviewed.)

Figure 2D:
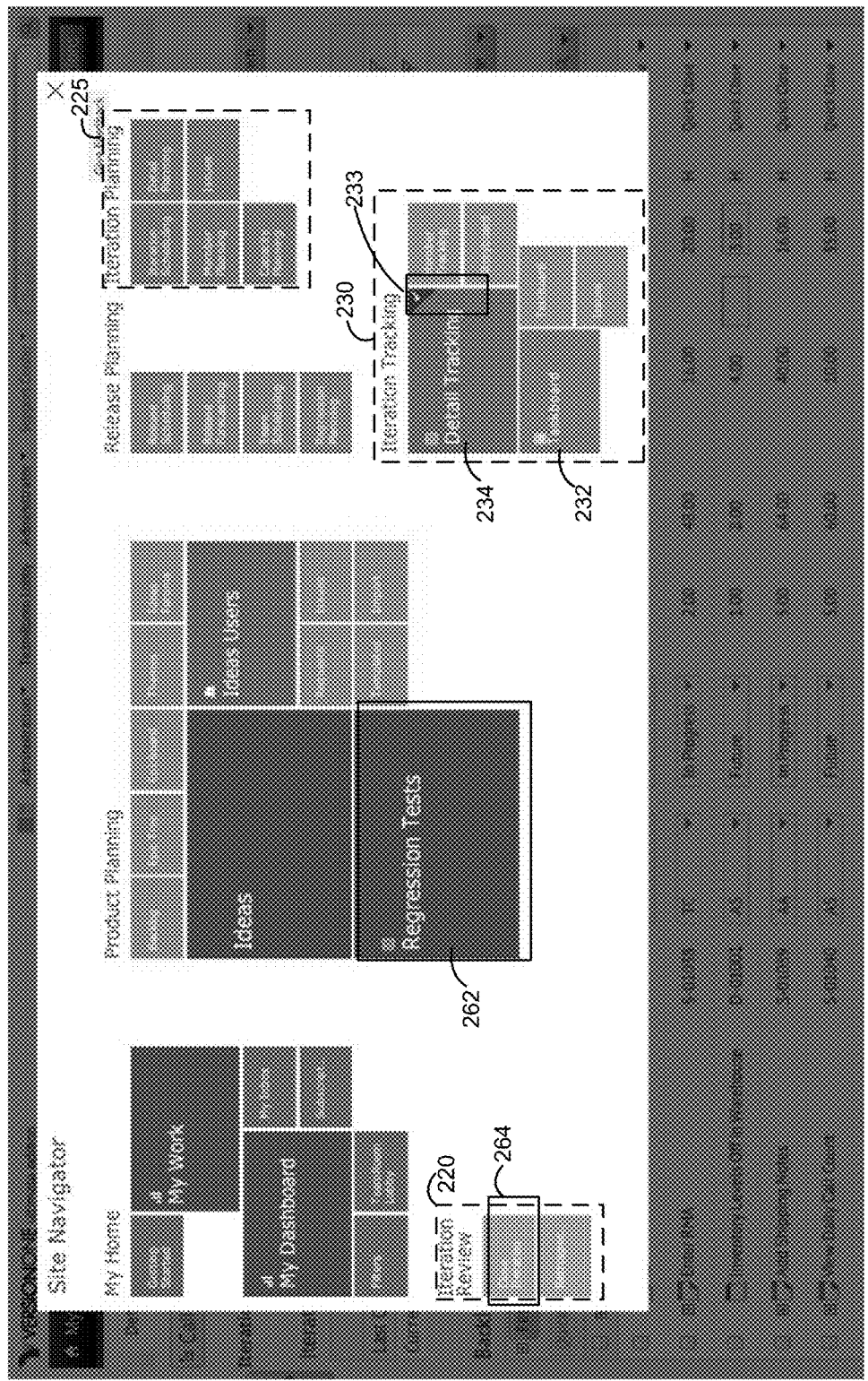

FIG. 2D illustrates the user interface of FIGS. 2A, 2B and 2C following a third period of user interactions with the menus and menu items shown therein. As shown in FIG. 2D, in some implementations, after a third set of predefined user interaction with the user interface 200 is detected and analyzed, the plurality of menu items 230 is displayed with one or more different visual characteristics than shown in FIG. 2C.

In some implementations, after a user has clicked the menu item 234 ("Detail Tracking") for more than 10 times in the past hour, which suggests that the user is using the menu item 234 intensively (at least currently), the menu item 234 ("Detail Tracking") is displayed with a different visual characteristic, e.g., with a larger or different front (e.g., bold, underlined, or italicized), at a different location (e.g., from upper left corner to the middle of the user interface 200), in a different shape (e.g., from a round shape to a square shape, or from a rectangle shape to a triangle shape), or using a different color (e.g., from black to red, from blue to yellow, or from while to black). Note that, in some cases, a displayed check mark 233 indicates that a predefined number (e.g., all or a majority) of tasks has begun or accomplished.

In some implementations, after a user has clicked the menu item 234 ("Detail Tracking") for more than a number N (e.g., 10) times in the past hour (or the user has performed a predefined amount of activities on the user interface 200, such as moving his/her mouse over the user interface 200 constantly in the past 10 minutes), which suggests that the user is using the menu item 234 intensively (at least currently), the menu item 234 ("Detail Tracking") is displayed with a different visual characteristic, e.g., with a larger or different front (e.g., bold, underlined, or italicized), at a different location (e.g., from upper left corner to the middle of the user interface 200), in a different shape (e.g., from a round shape to a square shape, or from a rectangle shape to a triangle shape), or using a different color (e.g., from black to red, from blue to yellow, or from while to black).

In some implementations, after a predefined user interaction with the plurality of menu items 230 is detected and analyzed, some menu items in the plurality of menu items 230 are displayed with a first visual characteristic, while some other menu items in the plurality of menu items 230 are displayed with a second visual characteristic distinct from the first visual characteristic.

For example, because a user selects the menu item 234 "Detailed Tracking" 20 times, but the menu item 232 "Taskboard" only once, the past hour, the menu item 234 "Detailed Tracking" is displayed in a bigger shape and/or a darker color as shown in FIG. 2D than that shown in FIG. 2C, while the menu item 232 "Taskboard" is displayed in a smaller shape and/or a lighter color as shown in FIG. 2D than that shown in FIG. 2C.

In some implementations, arrangement or a sequence in which menu items in a plurality of menu items is also changed in accordance with user interaction with the plurality of menu items. For example, after a user has selected the "Taskboard" for more than 200 times in the past 2 days, which in some cases may be interpreted as suggesting that the user has substantially completed one or more tasks displayed in the "Taskboard," the "Detail Tracking" 234 (which provides an alternative view of tasks than that shown in "Taskboard") is displayed more prominently than before, as it may be concluded that once the user has viewed tasks in a dashboard view (e.g., using "Taskboard"), the user would like to next view the tasks in a more detailed view (e.g., using "Detail Tracking").

Figure 2E:
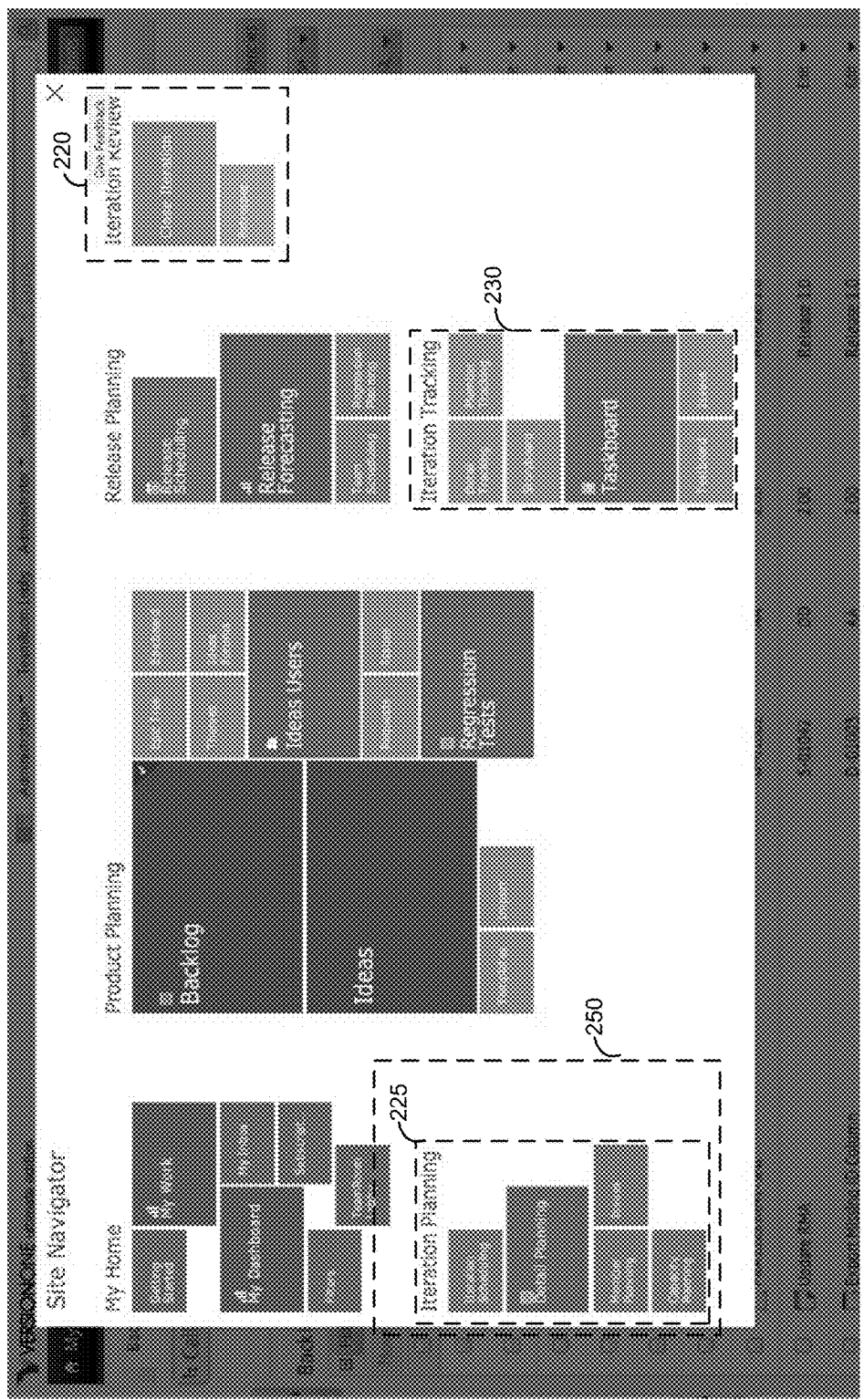

As shown in FIG. 2E, in some implementations, after a fourth set of predefined user interaction with the user interface 200 is detected and analyzed, the plurality of menu items 220 exchanges location with the plurality of menu items 230. For example, if a user has designated a portion (e.g., the lower left corner) of the user interface 200 as a favorite display region 250, a plurality of menu items that has been frequently used over a predefined time period (e.g., yesterday, the past hour, or the past month), in some implementations, is moved to the favorite display region 250, while any menu items previously displayed at the favorite display region 250 is relocated.

In some implementations, a visual UI (e.g., the user interface 200) is in addition to the underlying text menus. User interactions with the text menus can also be reflected in the visual UI, and the UI is overlaid on underlying text menus. In some implementations, the visual UI can be dismissed by click on the underlying menu or outside the UI or selection of a designated keyboard shortcut. In some implementations, the visual menu can be displayed in response to selection of displayed graphical shortcut or designated keyboard shortcut. For example, the underlying app is displayed in the FIGS. 2A-2E below the user interface 200.

Figure 3:
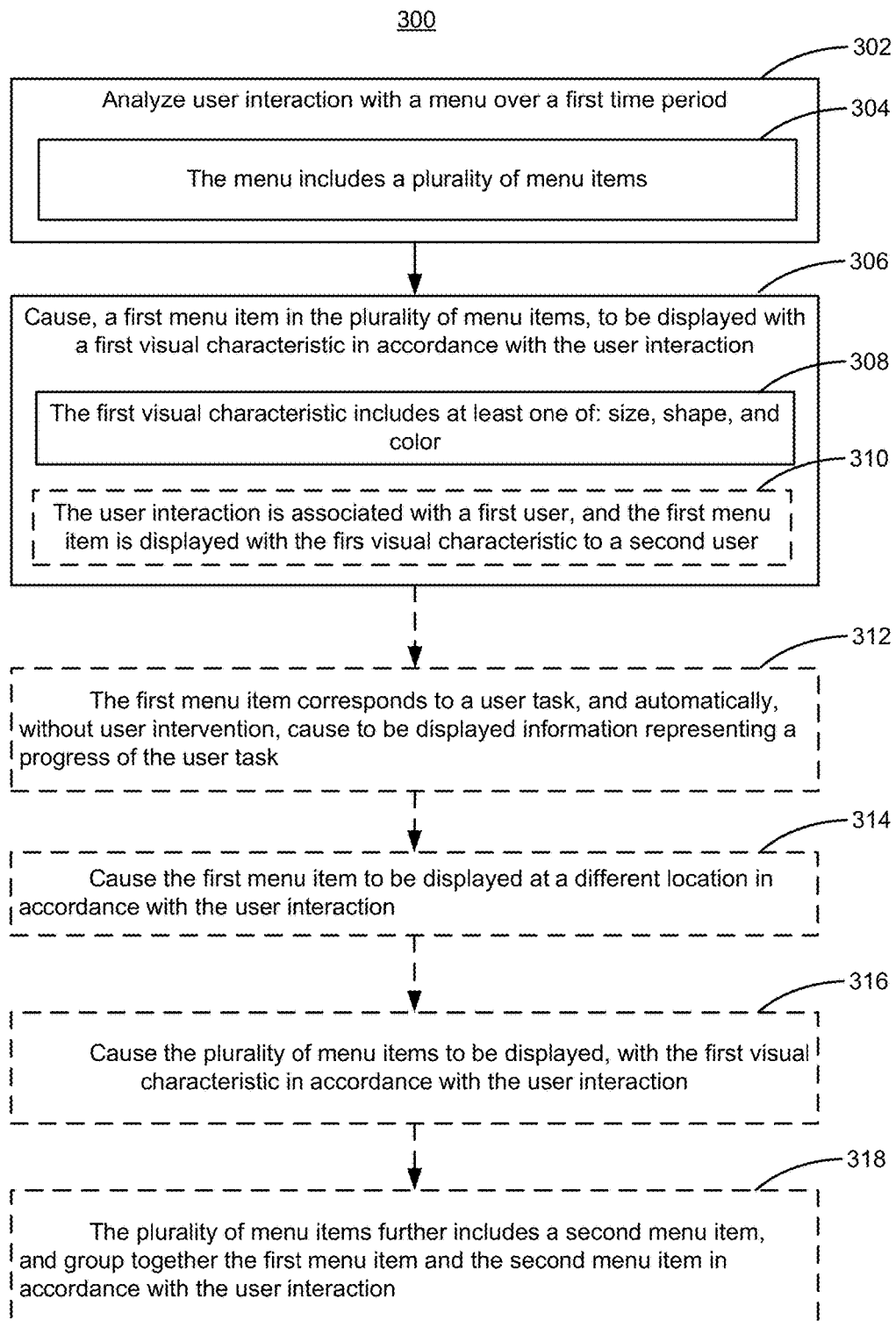
FIG. 3 is a flow chart illustrating a method for displaying menu items implemented at a computing device, in accordance with some implementations.

FIG. 3 is a flow chart illustrating a method for displaying menu items implemented at a computing device, in accordance with some implementations.

In some implementations, a method for displaying menu items includes: analyzing (302) user interaction with a menu over a first time period. In some implementations, analyzing user interaction includes monitoring how a user interacts with a menu (and menu items included therein), e.g., how often a user right-clicks the "My Work" item (shown in FIG. 2A), or how many time a user has double clicked the "My Dashboard" item (also shown in FIG. 2A) in the past 30 minutes.

In some implementations, the menu includes (302) a plurality of menu items. For example, the menu (e.g., the "My Home" menu 210) includes two or more menu items (the "My Work" item 212 and the "My Dashboard" item 214).

In some implementations, the method further includes, causing (306), a first menu item in the plurality of menu items, to be displayed with a first visual characteristic in accordance with the user interaction. In some implementations, the first visual characteristic relates (308) to at least one of: size, shape, and color.

In some implementations, the user interaction (310) is associated with a first user, and the first menu item is displayed with the first visual characteristic to a second user. For example, a software developer can arrange menu items display based on his/her own usage of the menu items, save the menu arrangement as user-customized settings, and assign the menu arrangement to another software developer who just joined the team, e.g., so as to avoid repeating same efforts all over again.

In some implementations, the first user, and the second user are associated with the same team. For example, a software developer can arrange (e.g., change) menu items display based on his/her own usage of the menu items, save the menu arrangement as user-customized settings, and assign the menu arrangement to a quality assurance engineer or a testing engineer who is on the same development team as the developer, e.g., so as to avoid repeating same efforts all over again.

In some implementations, the first user, and the second user are associated with a same project. For example, a software developer can arrange menu items display based on his/her own usage of the menu items, save the menu arrangement as user-customized settings, and assign the menu arrangement to a project manager who manages the software application/project for which the developer is responsible.

In some implementations, the first user, and the second user are associated with a same access privilege. For example, a software developer can arrange menu items display based on his/her own usage of the menu items, save the menu arrangement as user-customized settings, and assign the menu arrangement to an internal tester (as opposed to an outside tester or an end user) who tests internally (e.g., before production release) the software application/project for which the developer is responsible.

In some implementations, the second user is specified by the first user. For example, a software developer can arrange menu items display based on his/her own usage of the menu items, save the menu arrangement as user-customized settings, and assign or share (e.g., designate and identify) the menu item arrangement to a sales engineer on the same software application/project for which the developer is responsible. This also allowed the visual aspects of the user interface of a particularly skilled user of the software to be replicated to other users.

For example, these methods allow a senior software developer who is proficient at using the user interface 200 to customize the user interface 200 for a newly-hired junior software developer, who is much less familiar with the layout of menu items within the user interface 200 or who is less experienced about which menu items would be most useful to his/her job.

For another example, these methods also allow a software developer and a tester to customize the user interface 200 for each other (the developer for the test, and vice versa) in accordance with a current work flow. For example, when the developer has finished an interaction (e.g., by clicking the "Close Iteration" 264 item in group 220, the "Regression Tests" 262 grows bigger in size (and thus becomes more conspicuous and accessible), because after an interaction is closed, regression testing is in some agile development processes the next step to be carried out.

In some implementations, the user interaction with the menu takes place at a second computing device distinct from the computing device. For example, a user's interactions with menu items of the user interface 200 are tracked on the user's work computer, and when the user resumes work on a person computer, the menu items are displayed based on the tracked interactions (e.g., using different colors/shapes/fonts).

In some implementations, the user interaction with the menu is obtained from a computing cloud distinct from the computing device. For example, a user's interactions with menu items of the user interface 200 are tracked on the user's work computer, transmitted to a computing cloud (e.g., for backup or replication purposes), and the tracked user interactions can be download to the same or a different computer, e.g., for disaster recovery purpose or for portability purpose.

In some implementations, the user interaction with the menu is selected from a plurality of user interactions by the second user. For example, a user can customize own menu item arrangement based on selectively another user's interactions with the menu item. For example, when a software developer can customize his/her own display of the "Product Planning" menu item group, based on how a project manager interacts with the "Product Planning" menu item group—but not based on how the project manager interacts with the "My Home" menu item group, because the software developer may not be interested in customize own "My Home" menu item based on how the project manager's customization. These approaches enable a user to borrow data from another user, without requiring completing duplication, thereby increasing flexibility.

In some implementations, the first menu item corresponds to a user task, and further comprising: automatically, without user intervention, causing to be displayed information representing a progress of the user task. For example, in some cases, in addition to menu item layout, a progress tracker is displayed based on how a user has interacted with a menu item. For example, when a software developer has clicked off (e.g., indicating a task completion) one or more tasks listed under "My Work" menu item, the progress tracker 231, e.g., using a progress bar, information representing (e.g., a completion percentage) how complete the tasks listed under "My Work" menu item.

In some implementations, the method further includes, causing (314) the first menu item to be displayed at a different location in accordance with the user interaction. For example, based on how frequently or infrequently a user has sleeted menu items in the "Iteration Planning" group, the "Iteration Planning" is relocated to a different location (as shown in FIG. 2E) from where it was previously displayed (as shown in FIG. 2D).

In some implementations, the method further includes, causing the plurality of menu items to be displayed, with the first visual characteristic in accordance with the user interaction. For example, a user's interactions with a single menu item in a group of menu items, can be used to determine how the entire group of menu items (or a portion thereof) is display. For example, if a user has selected "Backlog" in the "Product Planning" group more than 26 times in the past 10 minutes, indicating an increased user interest in the "Product Planning" group, not only "Backlog" is displayed more prominently, but also the "Ideas"— because in some cases, "Ideas" are related to "Backlog."

In some implementations, the plurality of menu items further includes a second menu item, and further comprising: grouping together the first menu item and the second menu item in accordance with the user interaction. For example, a user's interactions with "My Work" and with "Regression Tests" (e.g., always selecting "Regression Tests" after closing down "My Work" for the past week) can cause "My Work" to be grouped together with (e.g., arranged with a predefined proximity to) "Regression Tests."

In some implementations, the first menu item and the second menu item are grouped together without regard to a work flow sequence between a first task corresponding to the first menu item and a second task corresponding to the second menu item. For example, menu items are in some cases grouped together regardless how a work sequence between tasks represented by these menu items. For example, if "Detail Tracking" and "Regression Tests" are two most frequently used menu items by a user, then in some cases, "Detail Tracking" and "Regression Tests" are grouped together, despite a lack of an apparent work flow relationship between these two items (as "Detail Tracking" relates to project planning and is thus often used by project managers, while "Regression Tests" relates to quality assurance and if thus often used by testers, and either can be performed before or in parallel with the other).

In some implementations, the plurality of menu items further includes (318) a second menu item, and further comprising: causing the first menu item and the second menu item in a sequence in accordance with the user interaction. For example, if in the past week, a user has more than 100 times, selected "Detail Tracking" after closing down "Regression Tests," then in some cases, the menu item "Regression Tests" is displayed adjacent to, and to the left of "Detail Tracking," which facilitates selecting "Regression Tests" and then "Detail Tracking." In these cases, user preferences are favored over predefined menu items arraignments.

In some implementations, the sequence in which the first menu item and the second menu item are displayed is independent from a work flow sequence between a first task corresponding to the first menu item and a second task corresponding to the second menu item. For example, if in the past week, a user has more than 100 times, selected "Unit Testing" after closing down "Regression Tests," then in some cases, the menu item "Regression Tests" is displayed adjacent to, and to the left of "Unit Testing," which facilitates selecting "Regression Tests" and then "Detail Tracking"—although from in some agile development processes, unit testing is supposed to be done before regression testing. In these cases, user preferences are favored over predefined work flow relationships and corresponding menu item arrangements.

In some implementations, the user interaction is associated with a first user, and the first menu item is displayed with the first visual characteristic to the first user. In some implementations, a user's interaction with menu items is applied to only that user. For example, user A's interaction with the user interface 200 may cause the user interface 200 to be displayed different to the user A, but would not change the user interface 200 in any way for user B. In these cases, user interactions/behaviors are considered unique to a user and are thus not applied to other users.

In some implementations, the user interaction is associated with a first user having a first privilege type, and the method further includes: identifying a predefined user action with respect to the menu by a second user having a second privilege type; and causing, the first menu item in the plurality of menu items, to be displayed with a second visual characteristic in accordance with the second privilege, without regard to the user interaction.

In some implementations, a user's access privilege takes priority over user interaction, in terms of menu item customization. For example, interaction by a software developer with the user interface 200 would not change the user interface 200 for a project manager, because the project manager has a different (e.g., higher) access privilege. Instead, the user interface is displayed (e.g., customized) for the project manager, based on the project managers' own customization settings.

FIG. 4 is a block diagram illustrating a computing system 400 for displaying menu items, in accordance with some implementations. The (e.g., agile development management) system 400 includes a computing (e.g., server) system 404 coupled to one or more other computing (e.g., client) systems 402 by a network 406. The client systems 402 may include client systems associated with respective users such as software developers, testers, managers, clients, customers, vendors, and any other parties involved in agile software development. The network 406 may be any suitable wired and/or wireless network and may include a local area network (LAN), wide area network (WAN), virtual private network (VPN), the Internet, metropolitan area network (MAN), or any combination of such networks.

The server system 404 includes a server 408 and a database 410. Server 408 serves as a front-end for the server system 404. Server 408, sometimes called a front end server, provides an interface between the server system 404 and the client systems 402. In some implementations, the functions of server 408 may be divided or allocated among two or more servers.

The server system 404 stores data relating to the agile development process, including user interaction data 412 and visual characteristics 414. The user interaction data 412 includes information representing user interaction with one or more menu items over a predefined time period. The visual characteristics 414 includes properties relating to displaying menu items visually, such as in what colors a dropdown list can be displayed, or at what display locations a group of user items is displayed by default.

It should be appreciated that the server system 404, including the server 408 and the database 410, may be implemented as a distributed system of multiple computers. However, for convenience of explanation, the server system 404 is described herein as being implemented on a single computer, which can be considered a single logical system.

In some implementations, a user interacts with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some implementations, a user may interact with the server system 404 via an agile development user interface 422 presented on the display 420. In some implementations, the agile development user interface 422 includes the user interface 200. Examples of user interfaces 422 are illustrated in FIGS. 2A-2E. In some implementations, the agile development user interface 422 may be a web-based user interface. That is, the user interface 422 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a JavaScript application that interfaces with the server system 404 via an application programming interface (API). The JavaScript application receives asset data and reporting data from the server system 404, manages the rendering of that data at the client, and also performs the client-side aspects of other tasks, such as receiving user input assigning assets to goals and updating attribute values according to data entered in user input fields, and transmitting user requests to the server system 404.

In some other implementations, the agile development user interface 422 may be a part of a stand-alone application that is run on the client system 402. The standalone application may interface with the server system 404 via an application programming interface (API).

The agile development management system 400 may perform the methods 300 in accordance with some implementations. Performance of various operations in the methods 300 may be divided between the client system 402 and server system 404. For example, operation 302 may be performed at a client system 402, and the received input may be transmitted to the server system 404, where operations 304-306 (method 300) are performed. The results of operations 306 then are transmitted to the client system 402, where operations 308 are performed. This allocation of operations between the client system 402 and server system 404 is merely one example of multiple possible allocations. Instead of using a client-server model, the agile development management software may be installed and used on a single computer system combining the functionalities of the server system 404 and client system 402. For example, the methods 300 (FIG. 3) may be performed entirely on a single computer system.

Figure 5:
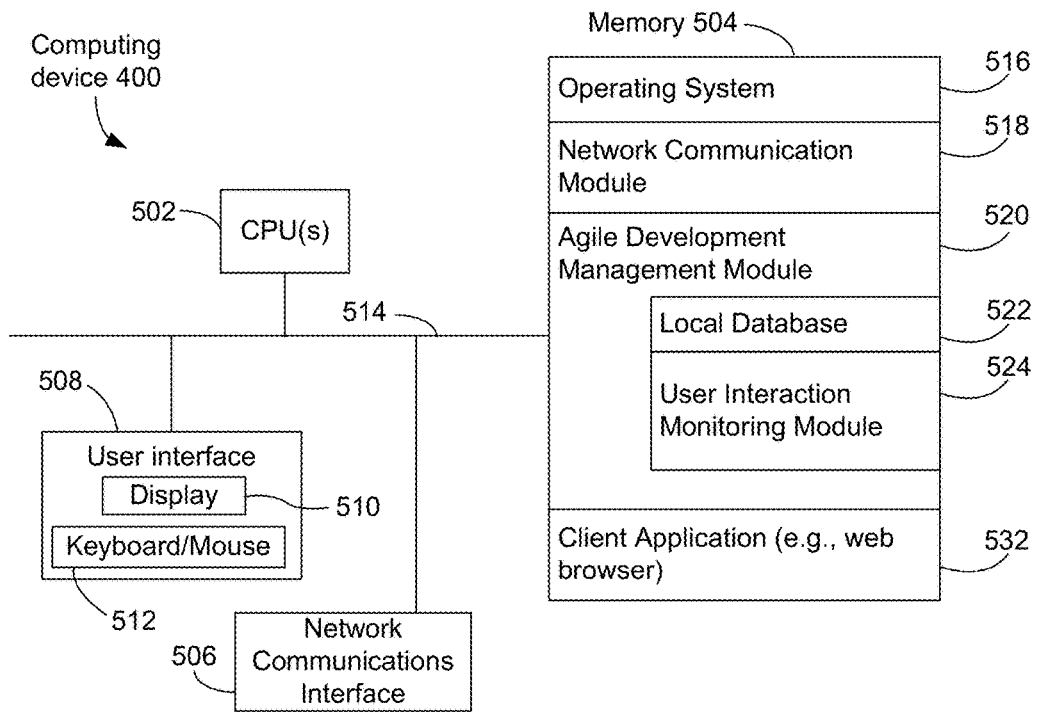
FIG. 5 is a block diagram illustrating a computing device for displaying menu items, in accordance with some implementations.

FIG. 5 is a block diagram illustrating a computing device for displaying menu items, in accordance with some implementations. The computing device 500, which may be used as a client system 402 (FIG. 4), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include user interface hardware 508 comprising a display device 510 and a keyboard and/or mouse (or other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately non-volatile memory device(s) within memory 504, comprises a computer readable storage medium. In some implementations, memory 504 stores the following programs, modules, and data structures, or a subset thereof:

- an operating system 516 that includes procedures for handling various basic system services and for performing hardware dependent tasks;
- a network communication module 518 that is used for connecting the client computer 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 532, such as a web browser.

In some implementations, the agile development management module 520 includes a local database 522 for storing data sent by the server (e.g., user interaction data), a user interaction monitoring module 524 for monitoring user interaction with respect to one or more menu items over a predefined time period, and for displaying a menu item using one or more visual characteristics (e.g., shape, front, font size, color, contrast, location, group, and ungrouping) in accordance with the user interaction data.

In some implementations, the agile development management module 520 may be a script-based module, embedded in a web page served from the server system 404 (FIG. 4). The web page may be rendered by a client application 532, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other implementations, the agile development management module 520 may be a standalone application stored in memory 504 of the client computer 500.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 504 may store a subset of the modules and data structures identified above. Furthermore, memory 504 may store additional modules and data structures not described above.

Figure 6:
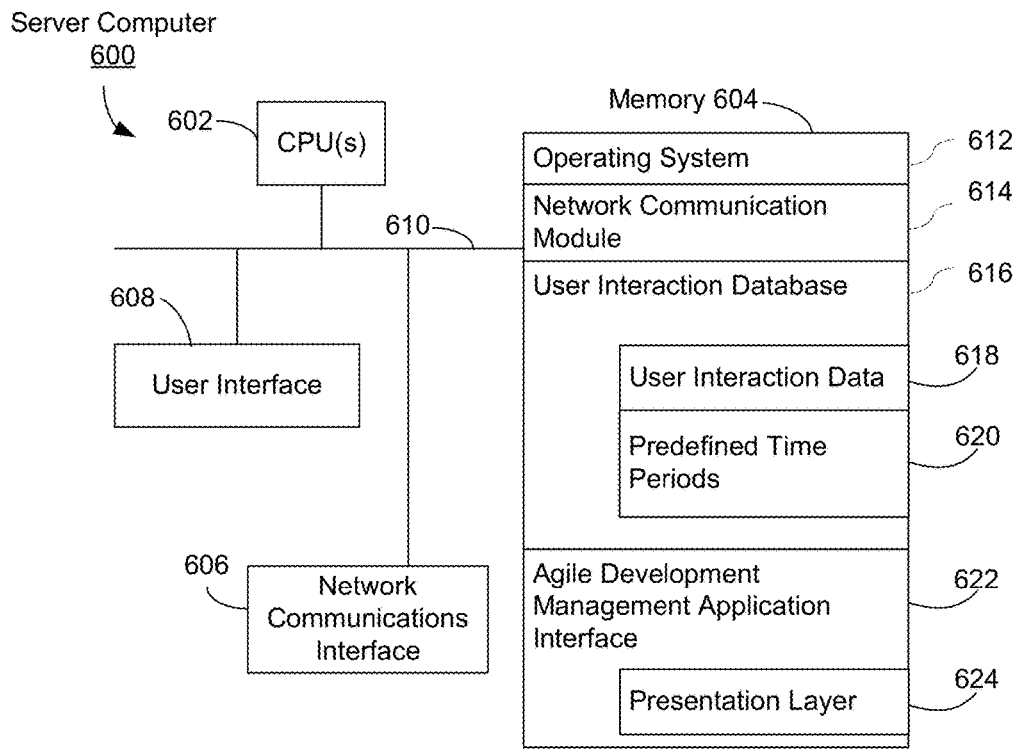
FIG. 6 is a block diagram illustrating another computing device for displaying menu items, in accordance with some implementations.

FIG. 6 is a block diagram illustrating another computing device (e.g., a sever computer) 600 for displaying menu items, in accordance with some implementations.

The server computer 600, which may be used as a server system 404 (FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include user interface hardware 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately non-volatile memory device(s) within memory 604, comprises a computer readable storage medium. In some implementations, memory 604 stores the following programs, modules and data structures, or a subset thereof:

- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;

a user interaction database 616 for storing data relating to user interaction data 618 collected from one or more client computers or from one or more distinct users, over one or more predefined time periods 620;

an agile development management application programming interface (API) 622 for exchanging information with the agile development management modules 520 in one or more client computers 500.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the implementations described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as goal, feature group, feature, defect, task, or test. An "Attribute Definition" table defines the attributes associated with each kind of asset listed in the "Asset Type" table. A "Synthetic Attribute" table references formulas used to calculate synthetic attributes. For example, if a work estimate or degree of completion is defined as a roll-up of estimates or degrees of completion for other assets, the roll-up may be specified in a Synthetic Attribute table. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7 in accordance with some implementations. In some implementations, a table 700 corresponds to a particular type of asset, such as a goal, feature group, feature, defect, task, or test. The asset table 700 includes a row 702 for each respective asset stored in the table. Each row includes fields that contain values for attributes of the respective asset, as defined in the "Attribute Definition" table. For example, the attribute fields may include a title 704, an asset ID 706, a project 708, an estimate 710, and various other attributes 720 (e.g., progress/degree of completion). The asset table 700 also includes fields 722 to specify attributes that are associated (i.e., related) assets. For example, if a respective asset is a feature or defect, fields 722 may specify tasks and tests associated with the feature or defect, for example by providing the asset IDs of the tasks and tests. If a respective asset is a goal, fields 722 may specify work items assigned to the goal. In another example, a field 722 may specify an iteration to which an asset is assigned.

The tables 700 thus include information to allow the agile development management application interface 622 to respond to a request from a client computer 500 when a user seeks to create, display, and modify assets. The interface 622 can access the asset tables 700 (e.g., by writing to or querying the tables 700) in response to requests from the client computer 500.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having one or more processors and memory storing one or more programs for execution by the one or more processors so as to perform:
analyzing user interaction of a first user with a menu over a first time period, wherein the menu includes a plurality of menu items, and the plurality of menu items includes a first menu item with a predefined visual characteristic, wherein the first user has a first access privilege;
analyzing work flow and logical relationships between menu items in the plurality of menu items over the first time period;
causing the first menu item in the plurality of menu items to be displayed with a first visual characteristic to a second user, wherein the first visual characteristic is modified from the predefined visual characteristic in accordance with (i) the user interaction of the first user with the menu over the first time period and (ii) the work flow and logical relationships between the menu items in the plurality of menu items over the first time period;
identifying a predefined user action with respect to the menu by a third user having a third access privilege, wherein the third access privilege is higher than the first access privilege; and
causing the first menu item in the plurality of menu items to be displayed with a second visual characteristic to the third user in accordance with the third access privilege without regard to the user interaction of the first user, wherein the second visual characteristic is modified from the predefined visual characteristic without regard to the user interaction of the first user;
wherein the predefined visual characteristic, the first visual characteristic, and the second visual characteristic relate to at least one of: size, shape, and color.

2. The method of claim 1, wherein the first user and the second user are associated with a same team.

3. The method of claim 1, wherein the first user and the second user are associated with a same project.

4. The method of claim 1, wherein the second user has a second access privilege, and the first access privilege of the first user and the second access privilege of the second user are associated with a same access privilege.

5. The method of claim 1, wherein the user interaction of the first user with the menu takes place at a second computing device distinct from the computing device.

6. The method of claim 1, wherein the user interaction of the first user with the menu is obtained from a computing cloud distinct from the computing device.

7. The method of claim 1, wherein the user interaction of the first user with the menu is selected from a plurality of user interactions by the first user.

8. The method of claim 1, wherein the first menu item corresponds to a user task, and further comprising: automatically, without user intervention, causing to be displayed information representing a progress of the user task.

9. The method of claim 1, further comprising: causing the first menu item to be displayed at a different location in accordance with the user interaction of the first user.

10. The method of claim 1, further comprising: causing the plurality of menu items to be displayed, with the first visual characteristic in accordance with the user interaction of the first user.

11. The method of claim 1, wherein the plurality of menu items further includes a second menu item, and further comprising: grouping together the first menu item and the second menu item in accordance with the user interaction of the first user.

12. The method of claim 11, wherein the first menu item and the second menu item are grouped together without regard to a work flow sequence between a first task corresponding to the first menu item and a second task corresponding to the second menu item.

13. The method of claim 1, wherein the plurality of menu items further includes a second menu item, and further comprising: causing the first menu item and the second menu item to be displayed in a sequence in accordance with the user interaction of the first user.

14. The method of claim 13, wherein the sequence in which the first menu item and the second menu item are displayed is independent from a work flow sequence between a first task corresponding to the first menu item and a second task corresponding to the second menu item.

15. The method of claim 1, further comprising: wherein the user interaction is associated with the first user, and the first menu item is displayed with the first visual characteristic to the first user.

16. The method of claim 1, wherein the second user is specified by the first user.

17. A computing device comprising:
a processor;
memory; and
one or more programs for execution by the processor, wherein the one or more programs include instructions which when executed cause the computing device to:
monitor user interaction of a first user with a menu over a first time period, wherein the menu includes a plurality of menu items, and the plurality of menu items includes a first menu item with a predefined visual characteristic, wherein the first user has a first access privilege;
monitor work flow and logical relationships between menu items in the plurality of menu items over the first time period;
cause the first menu item in the plurality of menu items to be displayed with a first visual characteristic to a second user, wherein the first visual characteristic is modified from the predefined visual characteristic in accordance with (i) the user interaction of the first user with the menu over the first time period and (ii) the work flow and logical relationships between the menu items in the plurality of menu items over the first time period;
identify a predefined user action with respect to the menu by a third user having a third access privilege, wherein the third access privilege is higher than the first access privilege; and
cause the first menu item in the plurality of menu items to be displayed with a second visual characteristic to the third user in accordance with the third access privilege without regard to the user interaction of the first user, wherein the second visual characteristic is modified from the predefined visual characteristic without regard to the user interaction of the first user;
wherein the predefined visual characteristic, the first visual characteristic, and the second visual characteristic relate to at least one of: size, shape, and color.

18. A non-transitory computer readable storage medium storing one or more programs configured for execution by a computing device, the one or more programs comprising instructions which when executed cause the computing device to:
monitor user interaction of a first user with a menu over a first time period, wherein the menu includes a plurality of menu items, and the plurality of menu items includes a first menu item with a predefined visual characteristic, wherein the first user has a first access privilege;
monitor work flow and logical relationships between menu items in the plurality of menu items over the first time period;
cause the first menu item in the plurality of menu items to be displayed with a first visual characteristic to a second user, wherein the first visual characteristic is modified from the predefined visual characteristic in accordance with (i) the user interaction of the first user with the menu over the first time period and (ii) the work flow and logical relationships between the menu items in the plurality of menu items over the first time period;
identify a predefined user action with respect to the menu by a third user having a third access privilege, wherein the third access privilege is higher than the first access privilege; and
cause the first menu item in the plurality of menu items to be displayed with a second visual characteristic to the third user in accordance with the third access privilege without regard to the user interaction of the first user, wherein the second visual characteristic is modified from the predefined visual characteristic without regard to the user interaction of the first user;
wherein the predefined visual characteristic, the first visual characteristic, and the second visual characteristic relate to at least one of: size, shape, and color.

* * * * *